United States Patent
Zhou et al.

(10) Patent No.: US 11,749,985 B2
(45) Date of Patent: Sep. 5, 2023

(54) METHOD AND DEVICE FOR TIMING IN TIME-VARYING DISTANCE PROTECTION BASED ON MULTIPLE LINES IN TOWER

(71) Applicants: CHINA ELECTRIC POWER RESEARCH INSTITUTE, Beijing (CN); STATE GRID CORPORATION OF CHINA, Beijing (CN)

(72) Inventors: Zexin Zhou, Beijing (CN); Tianhua Li, Beijing (CN); Hong Cao, Beijing (CN); Yarong Guo, Beijing (CN); Xingguo Wang, Beijing (CN); Dingxiang Du, Beijing (CN); Delin Wang, Beijing (CN); Pengfei Lv, Beijing (CN); Zhi Zhang, Beijing (CN)

(73) Assignees: CHINA ELECTRIC POWER RESEARCH INSTITUTE, Beijing (CN); STATE GRID CORPORATION OF CHINA, Beijing (CN)

( * ) Notice: Subject to any disclaimer, the term of this patent is extended or adjusted under 35 U.S.C. 154(b) by 77 days.

(21) Appl. No.: 17/596,623

(22) PCT Filed: Oct. 31, 2019

(86) PCT No.: PCT/CN2019/114594
§ 371 (c)(1),
(2) Date: Dec. 14, 2021

(87) PCT Pub. No.: WO2021/008002
PCT Pub. Date: Jan. 21, 2021

(65) Prior Publication Data
US 2022/0239093 A1  Jul. 28, 2022

(30) Foreign Application Priority Data
Jul. 16, 2019  (CN) .......................... 201910641081.6

(51) Int. Cl.
*H02H 7/26* (2006.01)
*H02H 1/00* (2006.01)

(52) U.S. Cl.
CPC .......... *H02H 7/263* (2013.01); *H02H 1/0061* (2013.01); *H02J 2203/20* (2020.01)

(58) Field of Classification Search
CPC ...... H02J 2203/20; H02H 7/263; H02H 1/006
See application file for complete search history.

(56) References Cited

U.S. PATENT DOCUMENTS

2004/0022195 A1   2/2004   Chen
2004/0090725 A1*  5/2004   Rehtanz .................... H02J 3/00
                                                       361/62
(Continued)

FOREIGN PATENT DOCUMENTS

| CN | 101764396 A | 6/2010 |
| CN | 102545174 A | 7/2012 |

(Continued)

OTHER PUBLICATIONS

Nikolaidis, V.C., Savvopoulos, N, Safigianni, A.S,. Vournas, C.D.; Adjusting Thrid Zone Distance Protection to Avoid Voltage Collapse; IEEE Power Systems Computation Conference; Aug. 22, 2014; 7 pages. (Year: 2014).*

(Continued)

*Primary Examiner* — Harry R Behm
(74) *Attorney, Agent, or Firm* — Syncoda LLC; Feng Ma

(57) ABSTRACT

A method and device for timing in time-varying distance protection based on multiple lines of a tower. The method includes: collecting an instantaneous current value at a time-varying distance protection installation location in the multiple lines of the tower, and acquiring preset parameters; calculating, according to the preset parameters and a multi-line ranging model, a multi-line ranging result; calculating, (Continued)

according to the preset parameters, the multi-line ranging result, and an adaptive calculation model, time of a section-II distance protection action and final time of a section-III distance protection action; and determining, according to the instantaneous current value, the preset parameters, and a cross-line failure auxiliary criterion model, final time of the section-II distance protection action.

11 Claims, 2 Drawing Sheets

(56) References Cited

U.S. PATENT DOCUMENTS

| | | | | |
|---|---|---|---|---|
| 2010/0225329 | A1* | 9/2010 | Akke | H02H 3/402 |
| | | | | 324/525 |
| 2010/0277181 | A1* | 11/2010 | Saha | G01R 31/088 |
| | | | | 324/521 |
| 2019/0094291 | A1* | 3/2019 | Schweitzer, III | H02H 7/265 |
| 2019/0199090 | A1 | 6/2019 | Ha et al. | |

FOREIGN PATENT DOCUMENTS

| | | | |
|---|---|---|---|
| CN | 104198881 B | * | 9/2017 |
| CN | 109066607 A | | 12/2018 |
| CN | 109142967 A | | 1/2019 |
| CN | 109149533 A | | 1/2019 |
| CN | 109167341 A | | 1/2019 |
| CN | 109301799 A | | 2/2019 |
| EP | 3291399 A1 | | 3/2018 |

OTHER PUBLICATIONS

International Search Report in the international application No. PCT/CN2019/114594, dated Apr. 15, 2020.

Discuss on a Novel Setting Principal for Distance Protection, Wang Yunhao, Liu Nan, Wu Jie, State Grid Tianjin Electric Power Company, Tianjin 300013, China, vol. 44, In Aug. 2016.

An Adaptive Backup Distance Relaying Scheme Based on Communication Between Neighboring Substations, Chen Mlengxiao et al, College of Electrical Engineering, Zhejiang University, Hangzhou 310027, Zhejiang Province, China, State Power Economic Research Institute, Changping District, Beijing 100052, China, vol. 41, No. 2, In Feb. 2017.

Written Opinion of the International Search Authority in the international application No. PCT/CN2019/114594, dated Apr. 15, 2020.

* cited by examiner

METHOD AND DEVICE FOR TIMING IN TIME-VARYING DISTANCE PROTECTION BASED ON MULTIPLE LINES IN TOWER

CROSS-REFERENCE TO RELATED APPLICATIONS

This application is a national stage of International Application No. PCT/CN2019/114594 filed on Oct. 31, 2019, which claims priority to Chinese Patent Application No. 201910641081.6 filed on Jul. 16, 2019. The disclosures of the above-referenced applications are hereby incorporated by reference in their entirety.

TECHNICAL FIELD

The disclosure relates to the field of power system and automation thereof in electric technology, for example, to a same-tower multiple lines time-varying distance protection timing method and a device.

BACKGROUND

Setting calculation is an important condition for ensuring normal performance of a relay protection device. Distance backup protection of a line needs to cooperate with a distance backup protection of an adjacent line. When a power grid structure changes due to that a line is disconnected, newly built or the like, it is necessary to recalculate and modify a distance backup protection setting value, which takes a large amount of time and management costs. As a result of inconsistency between plans and implementations of an infrastructure project, the modification of setting values cannot be done at a time, which results in a failure in cooperation between setting values during modification. At the same time, there is a potential safety risk that errors occur in modification during the setting value modification.

Time-varying distance protection may avoid setting of a time delay setting value of distance backup protection, distance backup protection action time in the whole grid may cooperate adaptively, which is not affected by a wiring form and failure pattern in the power grid, and may ensure preferred action of a distance protection backup section of the failed line. An action time range meets specification requirements, and there is no uncooperative point in the whole grid. A distance backup protection cooperating scheme which is more optimized than time-specific setting calculation is achieved for the whole grid.

The timing method is the core method of time-varying distance protection. A set of formulas for calculating time of section-II distance protection action and time of section-III distance protection action by utilizing information of a current a local side acquired by a protection device at the moment of failure, and setting values such as a measured impedance and a line length of the distance protection device, to perform on-line calculation of the action time. Cooperation of time of adjacent protection actions is realized.

As for multiple lines of a same tower, the accuracy of the measured impedance decreases in the case of cross-line failure, etc., and the calculated action time may not meet the cooperation relationship of adjacent lines.

SUMMARY

Provided is a method and device method for timing in time-varying distance protection based on multiple lines of a tower, which may solve the problem described in the background that for multiple lines of a same tower, the accuracy of the measured impedance decreases in the case of cross-line failure, etc., and the calculated action time may not meet the cooperation relationship of adjacent lines.

The method for timing in time-varying distance protection based on multiple lines of a tower includes: collecting an instantaneous current value at a time-varying distance protection installation location in the multiple lines of the tower, and acquiring preset parameters; calculating, according to the preset parameters and a multi-line ranging model, a multi-line ranging result; calculating, according to the preset parameters, the multi-line ranging result, and an adaptive calculation model, time $t_{II}$ of a section-II distance protection action and final time $t_{III}$ of a section-III distance protection action; determining, according to the instantaneous current value, the preset parameters, and a cross-line failure auxiliary criterion model, final time $t'_{II}$ of the section-II distance protection action.

The device for timing in time-varying distance protection based on multiple lines of a tower includes: a parameter collection and acquisition unit, connected to a multi-line ranging model unit, an adaptive calculation model unit and a cross-line failure auxiliary criterion model unit respectively, and configured to: collect and acquire preset parameters and send the preset parameters to the multi-line ranging model unit, the adaptive calculation model unit and the cross-line failure auxiliary criterion model unit; the multi-line ranging model unit, connected to the adaptive calculation model unit, and configured to: calculate, according to the preset parameters sent by the collection and acquisition parameter unit and a multi-line ranging model, a multi-line ranging result, and send the multi-line ranging result to the adaptive calculation model unit; the adaptive calculation model unit, connected to the cross-line failure auxiliary criterion model unit, and configured to: calculate, according to the preset parameters, the multi-line ranging result sent by the multi-line ranging model unit, and an adaptive calculation model, time of a section-II distance protection action and final time of a section-III distance protection action, and send the time of the section-II distance protection action to the cross-line failure auxiliary criterion model unit; and the cross-line failure auxiliary criterion model unit, configured to: determine, according to the preset parameters, a cross-line failure auxiliary criterion model, and an instantaneous current value at a time-varying distance protection installation location in the multiple lines of the tower, a final time of section-II distance protection action.

DETAILED DESCRIPTION

Figure 1:
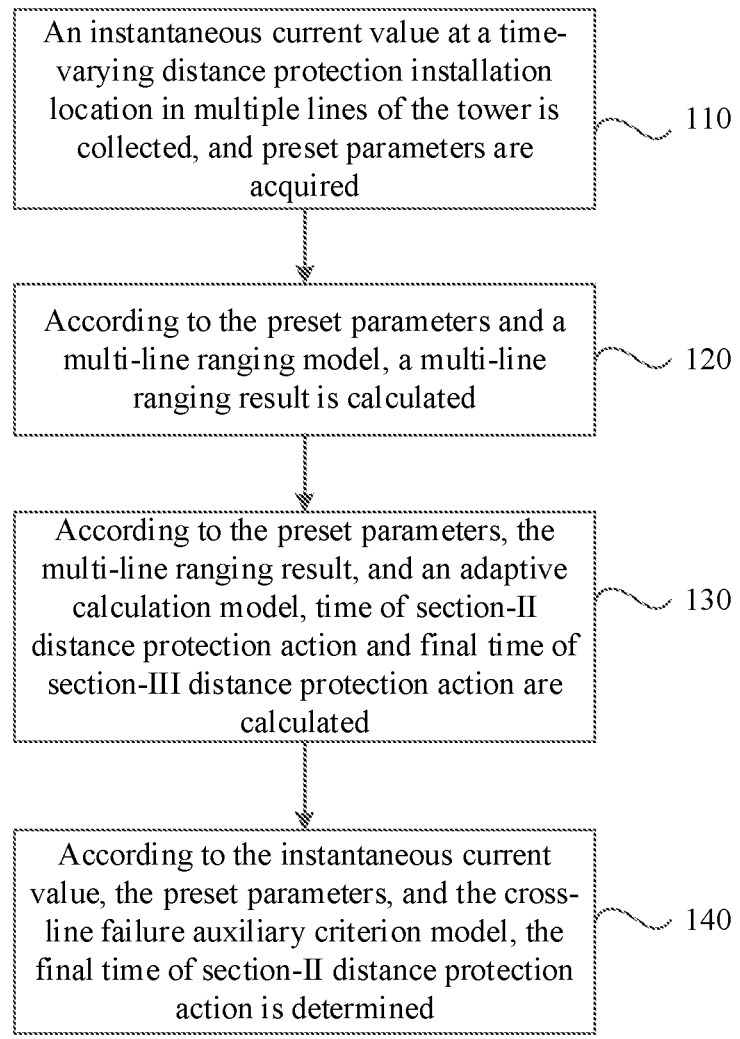
FIG. 1 illustrates a flowchart of a method for timing in time-varying distance protection based on multiple lines of a tower according to particular embodiments of the disclosure.

The exemplary embodiments of the disclosure are now described with reference to the drawings. However, the disclosure may be implemented in many different forms and is not limited the embodiments herein. The terms in the exemplary embodiments illustrated in the drawings are not intended to restrict the disclosure. In the drawings, same reference numerals are used for same units/elements.

Unless otherwise indicated, the terms (including technical terms) used herein have the same meaning as commonly understood by those skilled in the art. In addition, it will be understood that the terms defined by the commonly used dictionary should be understood to have a consistent meaning with the context of its related fields, and should not be understood as an idealized or excessively formal meaning.

FIG. 1 illustrates a flowchart of a method for timing in time-varying distance protection based on multiple lines of a tower according to particular embodiments of the disclosure. As illustrated in FIG. 1, the method includes the following operations.

At 110, an instantaneous current value at a time-varying distance protection installation location in multiple lines of the tower is collected, and preset parameters are acquired. The preset parameters include the collected instantaneous values of three phases of current to determine three phases of current fundamental phasors $\dot{I}_A$, $\dot{I}_B$ and $\dot{I}_C$. The current fundamental phasors $\dot{I}_{f\varphi_1}$ and $\dot{I}_{f\varphi_2}$ of the failure phases are set when the selected phases have an interphase failure. The fundamental phasor $\dot{I}_{\varphi_1}$ of the leading phase in the healthy phases is set and the fundamental phasor $\dot{I}_{\varphi_1}$ of the lagging phase in the healthy phases is set when the selected phases have a single-phase failure. A preset time range $K_0$, a length of a present line $C_L$, the number N of lines in the multiple lines, the distance protection ranging result C and the minimum time $t_{min}$ of the section-III distance protection action, the maximum time $L_{III.set}$ of the section-III distance protection action are acquired.

At 120, according to the preset parameters and a multi-line ranging model, a multi-line ranging result is calculated.

In some embodiments, the preset parameters include a distance protection ranging result C, a length $C_L$ of multiple lines of the tower, and a number N of lines in the multiple lines of the tower. A calculation formula of the multi-line ranging model is:

$$\begin{cases} C_D = \dfrac{C}{N} + \dfrac{(N-1)C_L}{N} & C \geq C_L \\ C_D = C & C < C_L \end{cases}$$

where $C_D$ is the multi-line ranging result, and the N is a positive integer.

At 130, according to the preset parameters, the multi-line ranging result, and an adaptive calculation model, time $t_{II}$ of section-II distance protection action and final time $t_{III}$ of section-III distance protection action are calculated.

In this operation, according to the preset parameters, the multi-line ranging result and the adaptive calculation model, an intermediate action time value $t_m$ (m=1, 2, 3, ..., M) may be calculated, the M is a positive integer.

In some embodiments, the preset parameters further include a time range $K_0$, a minimum time $t_{min}$ of the section-III distance protection action and a maximum time $L_{III.set}$ of the section-III distance protection action. There are six intermediate action time values in the adaptive calculation model, corresponding to following six calculation formulas:

$$\begin{cases} t_1 = a_{11}\sqrt{b_{11}C_D/C_L} & C_D \leq e_{11}C_L \\ t_1 = a_{12}\sqrt{b_{12}(C_D - c_{12}C_L)} + d_{12} & C_D > e_{11}C_L \end{cases};$$

$$t_2 = a_{21}\sqrt{C_D - c_{21}C_L};$$

$$\begin{cases} t_3 = a_{31}\sqrt{b_{31}(C_D - c_{31}C_L)} & d_{31}C_L \leq C_D \leq d_{31}C_L + e_{31} \\ t_3 = a_{32} & d_{31}C_L + e_{31} < C_D \end{cases};$$

$$\begin{cases} t_4 = a_{41}\sqrt{b_{41}(C_D - c_{41}C_L)} & d_{41}C_L \leq C_D \leq d_{41}C_L + e_{41} \\ t_4 = a_{42} & d_{41}C_L + e_{41} < C_D \end{cases};$$

$$t_5 = a_{51}(C_D/b_{51})^{c_{51}}; \text{ and}$$

$$\begin{cases} t_6 = a_{61}\sqrt{C_D - C_L} & C_L \leq C_D \leq C_L + e_{61} \\ t_6 = a_{62} & C_L + e_{61} < C_D \end{cases}$$

where $a_{11}$, $a_{12}$, $a_{21}$, $a_{31}$, $a_{32}$, $a_{41}$, $a_{42}$, $a_{51}$, $a_{61}$, $a_{62}$, $b_{11}$, $b_{12}$, $b_{31}$, $b_{41}$, $b_{51}$, $c_{12}$, $c_{21}$, $c_{31}$, $c_{41}$, $c_{51}$, $d_{12}$, $d_{31}$, $d_{41}$, $e_{11}$, $e_{31}$, $e_{41}$ and $e_{61}$ are all positive numbers.

In some embodiments, in the adaptive calculation model, the first six sets of calculation formulas of the intermediate values of the action time are $$\begin{cases} t_1 = 0.05\sqrt{100C_D/C_L} & C_D \leq 0.6C_L \\ t_1 = 0.1\sqrt{2(C_D - 0.6C_L)} + 0.387 & C_D > 0.6C_L \end{cases}$$

$$t_2 = 0.16\sqrt{C_D - 06C_L}$$

$$\begin{cases} t_3 = 0.15\sqrt{2(C_D - 1.05C_L)} & 1.05C_L \leq C_D \leq 1.05C_L + 10.89 \\ t_3 = 0.7 & 1.05C_L + 10.89 < C_D \end{cases}$$

$$\begin{cases} t_4 = 0.1\sqrt{2(C_D - 1.5C_L)} & 1.5C_L \leq C_D \leq 1.5C_L + 12.5 \\ t_4 = 0.5 & 1.5C_L + 12.5 < C_D \end{cases}$$

$$t_5 = 0.002 \times (C_D/5)^{2.5}$$

$$\begin{cases} t_6 = 0.15\sqrt{C_D - C_L} & C_L \leq C_D \leq C_L + 11.1 \\ t_6 = 0.5 & C_L + 11.1 < C_D \end{cases}$$

$t_1$, $t_2$, $t_3$, $t_4$, $t_5$, and $t_6$ mentioned above are in units of second.

After the intermediate action time value is calculated, the time $t_{II}$ of section-II distance protection action and the final time $t_{III}$ of section-III distance protection action may be calculated according to the preset parameters, the multi-line ranging result, the adaptive calculation model, and the intermediate action time value $t_m$. It is to be noted that the number of the intermediate action time values may also be more than six. In the case that the number of the intermediate action time values is more than six, the above-mentioned formulas that are used to calculate $t_1$, $t_2$, $t_3$, $t_4$, $t_5$, and $t_6$ may also be configured to calculate the first six intermediate action time values among the more than six intermediate values.

In some embodiments, in the adaptive calculation model, the formula for calculating the time $t_{II}$ of section-II distance protection action is:

when $0 \leq C_D \leq f_{11}C_L$, $t_{II} = t_1$, and if $t_{II} < g_{11}$, $t_{II} = g_{11}$;

when $f_{11}C_L < C_D \leq f_{21}C_L$, $t_{II} = (t_1 + t_2)\dfrac{K_0}{h_{21}}$, if $t_{II} < g_{21}$, $t_{II} = g_{21}$, and if $t_{II} > h_{22} + t_2$, $t_{II} = h_{22} + t_2$;

when $f_{21}C_L < C_D \leq f_{31}C_L$, $t_{II} = (t_1 + t_2 + t_3)\dfrac{K_0}{h_{31}}$, and if -continued $t_{II} > g_{31}, t_{II} = g_{31}$;

when $f_{31}C_L < C_D$, $t_{II} = (t_1 + t_2 + t_3 + t_4)\frac{K_0}{h_{41}}$, and if $t_{II} > g_{41}, t_{II} = g_{41}$, where $f_{11}$, $g_{11}$, $f_{21}$, $h_{21}$, $g_{21}$, $h_{22}$, $f_{31}$, $h_{31}$, $g_{31}$, $h_{41}$, and $g_{41}$ are all positive numbers, and $g_{21} \leq h_{22}+t_2$.

It is understood that in the formulas of this embodiment, "=" means "assignment" instead of "equal". For example, when $0 \leq C_D \leq f_{11}C_L$, $t_{II}=t_1$, and if $t_{II}<g_{11}$, $t_{II}=g_{11}$;" should be understood as when $0 \leq C_D \leq f_{11}C_L$, the value of $t_1$ is assigned to $t_{II}$. After the value of $t_1$ is assigned to $t_{II}$, if $t_{II}<g_{11}$, then the value of $g_{11}$ is assigned to $t_{II}$, so that the value of $t_{II}$ is adjusted from $t_1$ to $g_{11}$.

In some embodiments, in the adaptive calculation model, the formula for calculating the time $t_{II}$ of section-II distance protection action is:

when $0 \leq C_D \leq 0.6C_L$, $t_{II}=t_1$; and if $t_{II}<0.2$, $t_{II}$ is assigned to be 0.2 s;

when $$0.6C_L < C_D \leq 1.05C_L, t_{II} = (t_1 + t_2)\frac{K_0}{0.3};$$

if $t_{II}<0.5$, $t_{II}$ is assigned to be 0.5 s, and if $t_{II}>2+t_6$, $t_{II}$ is assigned to be $2+t_6$;

when $$1.05C_L < C_D \leq 1.5C_L, t_{II} = (t_1 + t_2 + t_3)\frac{K_0}{0.3},$$

if $t_{II}>3$, $t_{II}$ is assigned to be 3 seconds;

when $$1.5C_L < C_D, t_{II} = (t_1 + t_2 + t_3 + t_4)\frac{K_0}{0.3};$$

and if $t_{II}>5$, $t_{II}$ is assigned to be 5 s.

In some embodiments, in the adaptive calculation model, the formula for calculating the final time $t_{III}$ of section-III distance protection action is:

when $0 \leq C_D \leq f_{11}C_L$, $t_{III}=t_1+t_{min}+j_{11}$;

when $f_{11}C_L < C_D \leq f_{21}C_L$, $t_{III} = (t_1 + t_2)\frac{K_0}{j_{21}} + t_{min} - j_{22}$, if $t_{III} < k_{21} + t_{min}$, $t_{III} = k_{21} + t_{min}$, and if $t_{III} = k_{22} + t_6 + t_{min}$, $t_{III} > k_{22} + t_6 + t_{min}$;

when $f_{21}C_L < C_D \leq f_{31}C_L$, $t_{III} = (t_1 + t_2 + t_3)\frac{K_0}{j_{31}} + \frac{t_5(C_D - j_{32}C_L)}{j_{33}} + t_{min} - j_{34}$, and if $t_{III} > k_{31}$, $t_{III} = k_{31}$; and when $f_{31}C_L < C_D$, $t_{III} = (t_1 + t_2 + t_3 + t_4)\frac{K_0}{j_{41}} + t_5 + t_{min} - k_{41}$, and if $t_{III} > L_{III.set}$, $t_{III} = L_{III.set}$;

after $t_{III}$ is obtained, if $t_{III} > L_{III.set}$, $t_{III}=L_{III.set}$; where $f_{11}$, $f_{21}$, $j_{21}$, $j_{22}$, $k_{21}$, $k_{22}$, $f_{21}$, $f_{31}$, $j_{31}$, $j_{32}$, $j_{33}$, $j_{34}$, $k_{31}$, $f_{31}$, $j_{41}$ and $k_{41}$ are all positive numbers.

In some embodiments, in the adaptive calculation model, the formula for calculating the final time of section-III distance protection action $t_{III}$ is:

when $0 \leq C_D \leq 0.6C_L$, $t_{III}=t_1+t_{min}-0.2$;

when $0.6C_L < C_D \leq 1.05C_L$, $t_{III} = (t_1 + t_2)\frac{K_0}{0.3} + t_{min} - 0.2$ when $t_{III}<0.3+t_{min}$, assigned to be $0.3+t_{min}$; if $t_{III}>1.8+t_6+t_{min}$, $t_{III}$ is assigned to be $1.8+t_6+t_{min}$;

when $1.05C_L < C_D \leq 1.5C_L$, $t_{III} = (t_1 + t_2 + t_3)\frac{K_0}{0.3} + \frac{t_5(C_D - 1.05C_L)}{0.45C_L} + t_{min} - 0.2$, and if $t_{III}>10$, $t_{III}$ is assigned to be 10 s;

when $1.5C_L < C_D$, $t_{III} = (t_1 + t_2 + t_3 + t_4)\frac{K_0}{0.3} + t_5 + t_{min} - 0.2$, and if $t_{III}>L_{III.set}$, $t_{III}$ is assigned to be $L_{III.set}$; and after $t_{III}$ is calculated, for the multiple lines, if $t_{III}<2.5$, $t_{III}$ is assigned to be 2.5 s.

At 140, according to the instantaneous current value, the preset parameters, and the cross-line failure auxiliary criterion model, the final time $t'_{II}$ of section-II distance protection action is determined. According to the final time $t'_{II}$ of section-II distance protection action and the final time $t_{III}$ of section-III distance protection action, the cooperation of time of adjacent protection actions is completed.

In some embodiment, in response to that the distance protection phase-selection result is an interphase failure, it is determined whether an interphase failure auxiliary criterion is satisfied. In response to that the interphase failure auxiliary criterion is satisfied, then $t'_{II}=t_{II}$; or in response to that the interphase failure auxiliary criterion is not satisfied, $t'_{II}$ is assigned to be 1 second, when $t_{II}>1$.

In response to that the distance protection phase-selection result is a single-phase failure, determining whether a single-phase failure auxiliary criterion is satisfied. In response to that the single-phase failure auxiliary criterion is satisfied, then $t'_{II}=t_{II}$; or in response to that the single-phase failure auxiliary criterion is not satisfied, $t'_{II}$ is assigned to be 1 second when $t_{II}>1$.

In some embodiment, the cross-line failure auxiliary criterion model includes an interphase failure auxiliary criterion model and a single-phase failure auxiliary criterion model.

The formula of the interphase failure auxiliary criterion model is:

$$\begin{cases} \dfrac{|\dot{I}_{f\varphi 1} - \dot{I}_{f\varphi 2}|}{|\dot{I}_{f\varphi 1} + \dot{I}_{f\varphi 2}|} \geq \eta \\ \dfrac{||\dot{I}_{f\varphi 1}| - |\dot{I}_{f\varphi 2}||}{|\dot{I}_{f\varphi 1}| + |\dot{I}_{f\varphi 2}|} \leq \lambda \end{cases}$$

where $\dot{I}_{f\varphi 1}$ is a current fundamental phasor of one failed phase of the interphase failure; $\dot{I}_{f\varphi 2}$ is a current fundamental phasor of the other failed phase of the interphase failure; $\eta$ is a first interphase coefficient, $\eta < 1$; and $\lambda$ is a second interphase coefficient, $\lambda < 1$.

The formula of the single-phase failure auxiliary criterion model is:

$$\begin{cases} \theta_1 \leq \arg(\dot{I}_{\varphi 1} / \dot{I}_{\varphi 2}) \leq \theta_2 \\ \dfrac{||\dot{I}_{\varphi 1}| - |\dot{I}_{\varphi 2}||}{|\dot{I}_{\varphi 2}| + |\dot{I}_{\varphi 2}|} \leq \lambda \end{cases}$$

where $\dot{I}_{\varphi 1}$ is a current fundamental phasor of a leading phase in healthy phases; $\dot{I}_{\varphi 2}$ is a current fundamental phasor of a lagging phase in the healthy phases; $\theta_1$ is a first angle of a single phase; $\theta_2$ is a second angle of the single phase, $\theta_2 > \theta_1 > 90°$.

It is understood that $$\dfrac{|\dot{I}_{f\varphi 1} - \dot{I}_{f\varphi 2}|}{|\dot{I}_{f\varphi 1} + \dot{I}_{f\varphi 2}|} \geq \eta \text{ and } \dfrac{||\dot{I}_{f\varphi 1}| - |\dot{I}_{f\varphi 2}||}{|\dot{I}_{f\varphi 1} + \dot{I}_{f\varphi 2}|} \leq \lambda$$

need to be satisfied at the same time to determine that the interphase failure auxiliary criterion is satisfied; $\theta_1 \leq \arg(\dot{I}_{\varphi 1}/\dot{I}_{\varphi 2}) \leq \theta_2$ and $$\dfrac{||\dot{I}_{\varphi 1}| - |\dot{I}_{\varphi 2}||}{|\dot{I}_{\varphi 1}| + |\dot{I}_{\varphi 2}|} \leq \lambda$$

need to be satisfied at the same time to determine that the single-phase failure auxiliary criterion is satisfied.

Figure 2:
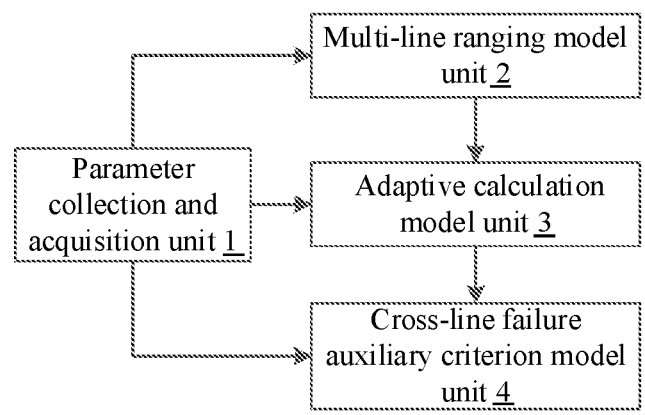
FIG. 2 illustrates a structural diagram of a device for timing in time-varying distance protection based on multiple lines of a tower according to particular embodiments of the disclosure.

FIG. 2 illustrates a structural diagram of a device for timing in time-varying distance protection based on multiple lines of a tower according to particular embodiments of the disclosure. As illustrated in FIG. 2, the device includes a parameter collection and acquisition unit 1, a multi-line ranging model unit 2, an adaptive calculation model unit 3 and a cross-line failure auxiliary criterion model unit 4.

The parameter collection and acquisition unit 1 is connected to the multi-line ranging model unit 2, the adaptive calculation model unit 3 and the cross-line failure auxiliary criterion model unit 4 respectively, and is configured to: collect and acquire preset parameters and send the preset parameters to the multi-line ranging model unit 2, the adaptive calculation model unit 3 and the cross-line failure auxiliary criterion model unit 4.

The multi-line ranging model unit 2 is connected to the adaptive calculation model unit 3, and is configured to: calculate, according to the preset parameters sent by the collection and acquisition parameter unit 1 and a multi-line ranging model, a multi-line ranging result, and send the multi-line ranging result to the adaptive calculation model unit 3.

The adaptive calculation model unit 3 is connected to the cross-line failure auxiliary criterion model unit 4, and is configured to: calculate, according to the preset parameters, the multi-line ranging result sent by the multi-line ranging model unit 2, and an adaptive calculation model, time of a section-II distance protection action and final time of a section-III distance protection action, and send the time of the section-II distance protection action to the cross-line failure auxiliary criterion model unit 4.

The cross-line failure auxiliary criterion model unit 4 is configured to: determine, according to the preset parameters, a cross-line failure auxiliary criterion model, and an instantaneous current value at a time-varying distance protection installation location in the multiple lines of the tower, a final time of section-II distance protection action.

In some embodiments, the preset parameters include a distance protection phase-selection result, a time range $K_0$, a length $C_L$ of the multiple lines of the tower, a number N of lines in the multiple lines of the tower, a distance protection ranging result C, a minimum time $t_{min}$ of the section-III distance protection action and a maximum time $L_{III.set}$ of the section-III distance protection action.

In some embodiment, the cross-line failure auxiliary criterion model includes an interphase failure auxiliary criterion model and a single-phase failure auxiliary criterion model.

In the disclosure, the parameters $a_{11}$, $a_{12}$, $a_{21}$, $a_{31}$, $a_{32}$, $a_{41}$, $a_{42}$, $a_{51}$, $a_{61}$, $a_{62}$, $b_{11}$, $b_{12}$, $b_{31}$, $b_{41}$, $b_{51}$, $c_{12}$, $c_{21}$, $c_{31}$, $c_{41}$, $c_{51}$, $d_{12}$, $d_{31}$, $d_{41}$, $e_{11}$, $e_{31}$, $e_{41}$, $e_{61}$, $f_{11}$, $g_{11}$, $f_{21}$, $h_{21}$, $g_{21}$, $h_{22}$, $f_{31}$, $h_{31}$, $g_{31}$, $h_{41}$, $g_{41}$, $f_{11}$, $j_{11}$, $f_{21}$, $j_{21}$, $j_{22}$, $k_{21}$, $k_{22}$, $f_{21}$, $f_{31}$, $j_{31}$, $j_{32}$, $j_{33}$, $j_{34}$, $k_{31}$, $f_{31}$, $j_{41}$, $k_{41}$, P, Q mentioned in the above formulas are all preset parameters. These preset parameters may all be adjusted and determined according to results of tests performed in advance.

In the description provided herein, numerous specific details are described. However, it is understood that the embodiments of the disclosure may be practiced without these specific details. In some embodiments, well-known methods, structures and technologies are not explained in detail, so as not to obscure the understanding of this specification.

Those skilled in the art will appreciate that the modules in the device in the embodiments may be adaptively changed and placed in one or more devices different from those in this embodiment. Modules or units or components in the embodiments may be combined into one module or unit or component, and may additionally be divided into multiple sub-modules or sub-units or sub-components. In addition to at least some of such features and/or processes or units being mutually exclusive, all of the features disclosed in this specification, including the accompanying claims, abstract and drawings, and all processes or units of any method or device so disclosed, may be employed in any combination. Unless expressly stated otherwise, each feature disclosed in this specification (including the accompanying claims, abstract and drawings) may be replaced by an alternative feature providing the same, equivalent or similar purpose. The operation numbers involved in this specification are merely used to distinguish the operations, and not to limit the temporal or logical relationship therebetween. Unless clearly defined in the context, the relationship between the various operations includes various possibilities.

Moreover, those skilled in the art will appreciate that although some embodiments described herein include certain features included in other embodiments but not other features, the combination of features of different embodiments means that they are within the scope of the disclosure and form different embodiments. For example, any one of the embodiments claimed in the claims can be used in any combination.

The various component embodiments of the disclosure may be implemented in hardware, or in a software module running on one or more processors, or in a combination thereof. The disclosure may also be implemented as a device or system program (for example, a computer program and a computer program product) for executing part or all of the method described herein. Such a program for implementing the disclosure may be stored on a computer-readable medium, or may have the form of one or more signals. Such signals may be downloaded from internet websites, or provided on carrier signals, or provided in any other form.

It is to be noted that the embodiments described above are illustrative and not restrictive of the disclosure, and alternative embodiments may be designed by those skilled in the art without departing from the scope of the appended claims. The word "comprising" does not exclude the presence of an element or step that is not listed in the claims. The word "a" or "an" preceding element does not preclude the presence of multiple such elements. The disclosure may be realized by means of hardware including several different elements and by means of a suitably programmed computer. In a unit claim listing several systems, several of these systems may be embodied by the same hardware item.

The beneficial effects of this article are that the technical solution of the disclosure provides a method and device for timing in time-varying distance protection based on multiple lines of a tower. The method may include: collecting and acquiring preset parameters; calculating, according to the preset parameters and a multi-line ranging model, a multi-line ranging result; calculating, according to the preset parameters, the multi-line ranging result, and an adaptive calculation model, time of a section-II distance protection action and final time of a section-III distance protection action; and determining, according to the preset parameters, and a cross-line failure auxiliary criterion model, final time of the section-II distance protection action. For the problem described that for multiple lines of a same tower, the accuracy of the measured impedance decreases in the case of cross-line failure, etc., and the calculated action time may not meet the cooperation relationship of adjacent lines, cooperation of protection action time between adjacent lines can be realized in occurrence of cross-line failure or single-phase failure in the multiple lines of the tower.

What is claimed is:

1. A method for timing in time-varying distance protection based on multiple lines of a tower, comprising:
   collecting an instantaneous current value at a time-varying distance protection installation location in the multiple lines of the tower, and acquiring preset parameters;
   calculating, according to the preset parameters and a multi-line ranging model, a multi-line ranging result;
   calculating, according to the preset parameters, the multi-line ranging result, and an adaptive calculation model, time $t_{II}$ of a section-II distance protection action and final time $t_{III}$ of a section-III distance protection action; and
   determining, according to the instantaneous current value, the preset parameters, and a cross-line failure auxiliary criterion model, final time $t'_{II}$ of the section-II distance protection action.

2. The method of claim 1, wherein the preset parameters comprise a distance protection ranging result C, a length $C_L$ of the multiple lines of the tower, and a number N of lines in the multiple lines of the tower, and a calculation formula of the multi-line ranging model is:

$$\begin{cases} C_D = \dfrac{C}{N} + \dfrac{(N-1)C_L}{N} & C \geq C_L \\ C_b = C & C < C_L \end{cases}$$

where $C_D$ is the multi-line ranging result, and the N is a positive integer.

3. The method of claim 2, wherein calculating, according to the preset parameters, the multi-line ranging result, and the adaptive calculation model, the time $t_{II}$ of the section-II distance protection action and the final time $t_{III}$ of the section-III distance protection action comprises:
   calculating, according to the preset parameters, the multi-line ranging result, the adaptive calculation model, an intermediate action time value;
   calculating, according to the preset parameters, the multi-line ranging result, the adaptive calculation model, and the intermediate action time value, the time $t_{II}$ of the section-II distance protection action and the final time $t_{III}$ of the section-III distance protection action.

4. The method of claim 3, wherein the preset parameters further comprise a time range $K_0$, a minimum time $t_{min}$ of the section-III distance protection action and a maximum time $L_{III,set}$ of the section-III distance protection action; there are six intermediate action time values in the adaptive calculation model, corresponding to the following six calculation formulas:

$$\begin{cases} t_1 = a_{11}\sqrt{b_{11}C_D/C_L} & C_D \leq e_{11}C_L \\ t_1 = a_{12}\sqrt{b_{12}(C_D - c_{12}C_L)} + d_{12} & C_D > e_{11}C_L \end{cases};$$

$$t_2 = a_{21}\sqrt{C_D - c_{21}C_L};$$

$$\begin{cases} t_3 = a_{31}\sqrt{b_{31}(C_D - c_{31}C_L)} & d_{31}C_L \leq C_D \leq d_{31}C_L + e_{31} \\ t_3 = a_{32} & d_{31}C_L + e_{31} < C_D \end{cases};$$

$$\begin{cases} t_4 = a_{41}\sqrt{b_{41}(C_D - c_{41}C_L)} & d_{41}C_L \leq C_D \leq d_{41}C_L + e_{41} \\ t_4 = a_{42} & d_{41}C_L + e_{41} < C_D \end{cases};$$

$$\begin{cases} t_6 = a_{61}\sqrt{C_D - C_L} & C_L \leq C_D \leq C_L + e_{61} \\ t_6 = a_{62}C_L + e_{61} < C_D \end{cases}$$

where $a_{11}, a_{12}, a_{21}, a_{31}, a_{32}, a_{41}, a_{42}, a_{51}, a_{61}, a_{62}, b_{11}, b_{12}, b_{31}, b_{41}, b_{51}, c_{12}, c_{21}, c_{31}, c_{41}, c_{51}, d_{12}, d_{31}, d_{41}, e_{11}, e_{31}, e_{41}$ and $e_{61}$ are all positive numbers.

5. The method of claim 4, wherein in the adaptive calculation model, the formula for calculating the time $t_{II}$ of the section-II distance protection action is:
   when $0 \leq C_D \leq f_{11}C_L$, $t_{II} = t_1$, and if $t_{II} < g_{11}$, $t_{II} = g_{11}$;

when $f_{11}C_L < C_D \leq f_{21}C_L$, $t_{II} = (t_1 + t_2)\dfrac{K_0}{h_{21}}$, if $t_{II} < g_{21}$, $t_{II} = g_{21}$, and if $t_{II} > h_{22} + t_2$, $t_{II} = h_{22} + t_2$;

-continued when $f_{21}C_L < C_D \le f_{31}C_L$, $t_{II} = (t_1 = t_2 + t_3)\dfrac{K_0}{h_{31}}$, and if $t_{II} > g_{31}$, $t_{II} = g_{31}$;

when $f_{31}C_L < C_D$, $t_{II} = (t_1 + t_2 + t_3 + t_4)\dfrac{K_0}{h_{41}}$, and if $t_{II} > g_{41}$, $t_{II} = g_{41}$, where $f_{11}$, $g_{11}$, $f_{21}$, $h_{21}$, $g_{21}$, $h_{22}$, $f_{31}$, $h_{31}$, $g_{31}$, $h_{41}$, and $g_{41}$ are all positive numbers.

6. The method of claim 5, wherein the preset parameters further comprise a distance protection phase-selection result; and determining, according to the instantaneous current value, the preset parameters, and the cross-line failure auxiliary criterion model, the final time $t'_{II}$ of the section-II distance protection action comprises:
in response to that the distance protection phase-selection result is an interphase failure, determining whether an interphase failure auxiliary criterion is satisfied; and in response to that the interphase failure auxiliary criterion is satisfied, keeping $t'_{II}=t_{II}$ unchanged, or in response to that the interphase failure auxiliary criterion is not satisfied, taking $t'_{II}$ to be P seconds when $t_{II} > P$, where P is a positive number; or
in response to that the distance protection phase-selection result is a single-phase failure, determining whether a single-phase failure auxiliary criterion is satisfied; in response to that the single-phase failure auxiliary criterion is satisfied, keeping $t'_{II}=t_{II}$ unchanged, or in response to that the single-phase failure auxiliary criterion is not satisfied, taking $t'_{II}$ to be Q seconds when $t_{II} > Q$, where Q is a positive number.

7. The method of claim 6, wherein the cross-line failure auxiliary criterion model comprises an interphase failure auxiliary criterion model and a single-phase failure auxiliary criterion model;
the formula of the interphase failure auxiliary criterion model is:

$$\begin{cases} \dfrac{|\dot{I}_{f\varphi1} - \dot{I}_{f\varphi2}|}{|\dot{I}_{f\varphi1} + \dot{I}_{f\varphi2}|} \ge \eta \\ \dfrac{||\dot{I}_{f\varphi1}| - |\dot{I}_{f\varphi2}||}{|\dot{I}_{f\varphi1}| + |\dot{I}_{f\varphi2}|} \le \lambda \end{cases}$$

where $\dot{I}_{f\varphi1}$ is a current fundamental phasor of one failed phase of the interphase failure; $\dot{I}_{f\varphi2}$ is a current fundamental phasor of the other failed phase of the interphase failure; $\eta$ is a first interphase coefficient, $\eta>1$; and $\lambda$ is a second interphase coefficient, $\lambda<1$; and
the formula of the single-phase failure auxiliary criterion model is:

$$\begin{cases} \theta_1 \le \arg(\dot{I}_{\varphi1}/\dot{I}_{\varphi2}) \le \theta_2 \\ \dfrac{||\dot{I}_{\varphi1}| - |\dot{I}_{\varphi2}||}{|\dot{I}_{\varphi1}| + |\dot{I}_{\varphi2}|} \le \lambda \end{cases}$$

where $\dot{I}_{\varphi1}$ is a current fundamental phasor of a leading phase in healthy phases; $\dot{I}_{\varphi2}$ is a current fundamental phasor of a lagging phase in the healthy phases; $\theta_1$ is a first angle of a single phase; $\theta_2$ is a second angle of the single phase, $\theta_2 > \theta_1 > 90°$.

8. The method of claim 4, wherein in the adaptive calculation model, the formula for calculating the final time of the section-III distance protection action $t_{III}$ is:
when $0 \le C_D \le f_{11}C_L$, $t_{III} = t_1 + t_{min} + j_{11}$;

when $f_{11}C_L < C_D \le f_{21}C_L$, $t_{III} = (t_1 + t_2)\dfrac{K_0}{j_{21}} + t_{min} - j_{22}$, if $t_{III} < k_{21} + t_{min}$, $t_{III} = k_{21} + t_{min}$, and if $t_{III} = k_{22} + t_6 + t_{min}$, $t_{III} > k_{22} + t_6 + t_{min}$;

when $f_{21}C_L < C_D \le f_{31}C_L$, $t_{III} = (t_1 + t_2 + t_3)\dfrac{K_0}{j_{31}} + \dfrac{t_5(C_D - j_{32}C_L)}{j_{33}} + t_{min} - j_{34}$, and if $t_{III} > k_{31}$, $t_{III} = k_{31}$; and when $f_{31}C_L < C_D$, $t_{III} = (t_1 + t_2 + t_3 + t_4)\dfrac{k_0}{j_{41}} + t_5 + t_{min} - k_{41}$, and if $t_{III} > L_{III.set}$, $t_{III} = L_{III.set}$;

after $t_{III}$ is obtained, if $t_{III} > L_{III.set}$, $t_{III} = L_{III.set}$; where $f_{11}$, $f_{21}$, $j_{21}$, $j_{22}$, $k_{21}$, $k_{22}$, $f_{21}$, $f_{31}$, $j_{31}$, $j_{32}$, $j_{33}$, $j_{34}$, $k_{31}$, $f_{31}$, $j_{41}$ and $k_{41}$ are all positive numbers.

9. A device for timing in time-varying distance protection based on multiple lines of a tower, comprising:
a parameter collection and acquisition component, connected to a multi-line ranging model component, an adaptive calculation model component and a cross-line failure auxiliary criterion model component respectively, and configured to: collect and acquire preset parameters and send the preset parameters to the multi-line ranging model unit, the adaptive calculation model unit and the cross-line failure auxiliary criterion model unit;
the multi-line ranging model component, connected to the adaptive calculation model component, and configured to: calculate, according to the preset parameters sent by the collection and acquisition parameter component and a multi-line ranging model, a multi-line ranging result, and send the multi-line ranging result to the adaptive calculation model component;
the adaptive calculation model component, connected to the cross-line failure auxiliary criterion model component, and configured to: calculate, according to the preset parameters, the multi-line ranging result sent by the multi-line ranging model component, and an adaptive calculation model, time of a section-II distance protection action and final time of a section-III distance protection action, and send the time of the section-II distance protection action to the cross-line failure auxiliary criterion model component; and
the cross-line failure auxiliary criterion model component, configured to: determine, according to the preset parameters, a cross-line failure auxiliary criterion model, and an instantaneous current value at a time-varying distance protection installation location in the multiple lines of the tower, a final time of section-II distance protection action.

10. The device of claim 9, wherein the preset parameters comprise a distance protection phase-selection result, a time range $K_0$, a length $C_L$ of the multiple lines of the tower, a number N of lines in the multiple lines of the tower, a distance protection ranging result C, a minimum time $t_{min}$ of the section-III distance protection action and a maximum time $L_{III.set}$ of the section-III distance protection action.

11. The device of claim 9, wherein the cross-line failure auxiliary criterion model comprises an interphase failure auxiliary criterion model and a single-phase failure auxiliary criterion model.

\* \* \* \* \*